United States Patent

Cooper, Jr.

[15] 3,673,509

[45] June 27, 1972

[54] INTERDIGITAL PREAMPLIFIER

[72] Inventor: Robert B. Cooper, Jr., Oklahoma City, Okla.

[73] Assignee: Edwin J. Sossen, Oklahoma City, Okla. ; a part interest

[22] Filed: Aug. 7, 1970

[21] Appl. No.: 62,056

[52] U.S. Cl. ....................330/31, 330/21, 333/73 S, 333/84 M

[51] Int. Cl. ....................H03f 3/04

[58] Field of Search ....................330/21, 31; 333/73 S, 84 M; 334/41

[56] References Cited

UNITED STATES PATENTS 3,252,096 5/1966 Carlson....................334/41

3,348,173 10/1967 Matthaei et al....................333/73 S 3,454,895 7/1969 Hall et al. ....................330/31

*Primary Examiner*—Roy Lake

*Assistant Examiner*—Lawrence J. Dahl

*Attorney*—Oblon, Fisher & Spivak

[57] ABSTRACT

A bandpass preamplifier for isolating a narrow frequency band, especially in the VHF or UHF range, from interference or out-of-band radiation generated by high energy transmitters operating at frequencies near the desired band. The circuit includes a first turnable combline bandpass filter, employing strip line inductive elements, which provides a narrow band input to a field effect transistor amplifier. A second similar filter receives the amplified signal and furnishes a very narrow band output signal characterized by very strong attenuation of out-of-band interference.

8 Claims, 2 Drawing Figures

INVENTOR
ROBERT B. COOPER, JR.

BY Oblon, Fisher & Spivak
ATTORNEYS

INTERDIGITAL PREAMPLIFIER

BACKGROUND OF THE INVENTION

1. Field Of The Invention

This invention relates generally to amplifying circuitry, and more particularly to a bandpass amplifier having a high degree of out-of-band attenuation.

2. Description Of The Prior Art

As the air waves of the world become increasingly crowded with powerful commercial radio and television broadcasts and the like, the problem of receiving low power signals has become even more acute. Consider, for example, the problem of detecting a weak radio signal in the VHF range emanating from a small distant transmitter at a receiving station located within any metropolitan area of the United States. If the air waves were not crowded, simply erecting a high gain antenna and coupling its output to conventional preamplifying and detecting equipment would, no doubt, allow clear reception of the desired signal. But with the proliferation of television transmitters, commercial radio transmitters, radio beacons and numberless other transmitters now in use, weak signal reception, especially in the VHF and UHF ranges has become a major problem. The root of the problem is, of course, out-of-band radiation produced by the various enumerated transmitters. A television transmitter, for example, located within a few miles of the high gain antenna mentioned above, may generate a signal one hundred thousand times as powerful as the desired signal and separated from it in frequency by no more than five or six megahertz. Naturally, the powerful television signal is capable of generating enough out-of-band radiation to completely mask the desired signal if conventional broad band receiving apparatus is used.

A similar problem exists in the community antenna television (CATV) field, when a giant, highly sensitive community antenna, intended to receive only distant television broadcasts, is located near a local television station transmitting on a channel adjacent the distant broadcast. Again, the weak distant signal may be completely masked by out-of-band interference produced by the local transmitter if conventional broad band receiving equipment is used.

A somewhat different but equally vexing problem caused by out-of-band interference is the production of beat frequencies within radio receiving equipment caused by the mixing of two out-of-band carriers. Such beat products may be continuous if caused by the mixing of carriers from constant source transmitters, such as broadcast TV or FM transmitters, or intermittent if caused by the mixing of one such constant source carrier, and one intermittent carrier, as from a police or aircraft transmitter.

Efforts to reduce these and other undesirable effects of out-of-band interference have, of course, been made in the past. Such efforts have centered mainly about the design of precise, purely passive bandpass filters. Such filters, however, even though often extremely expensive and very time consuming to manufacture, have been commonly found to be very difficult to tune to the desired pass band. In addition, many such filters were found to attenuate or distort the desired pass band to an undesirable extent while lacking sufficient out-of-band attenuation to warrant the expense of their construction.

SUMMARY OF THE INVENTION

Accordingly, one object of this invention is to provide a new active bandpass network having improved out-of-band interference attenuating properties.

Another object of this invention is to provide a novel bandpass preamplifier circuit that is both inexpensive to manufacture and easily tunable to a selected pass band.

A further object of this invention is the provision of an improved bandpass preamplifier network for use especially in the VHF and UHF ranges.

Yet another object of the instant invention is to provide an improved combination amplifier and bandpass filter having relatively distortion free performance.

Briefly, these and other objects of the invention are achieved by constructing a first filter circuit using strip line inductor elements. This filter circuit, which may be tuned to pass a selected band of frequencies, is coupled to the input of a solid state amplifier arranged in a common gate configuration. The amplifier output is coupled to a second tunable filter circuit which also includes strip line inductor elements. The output of the second filter circuit provides the desired bandpass signal substantially free of out-of-band interference.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DETAILED DESCRIPTION OF THE PREFERRED EMBODIMENT

Figure 1:
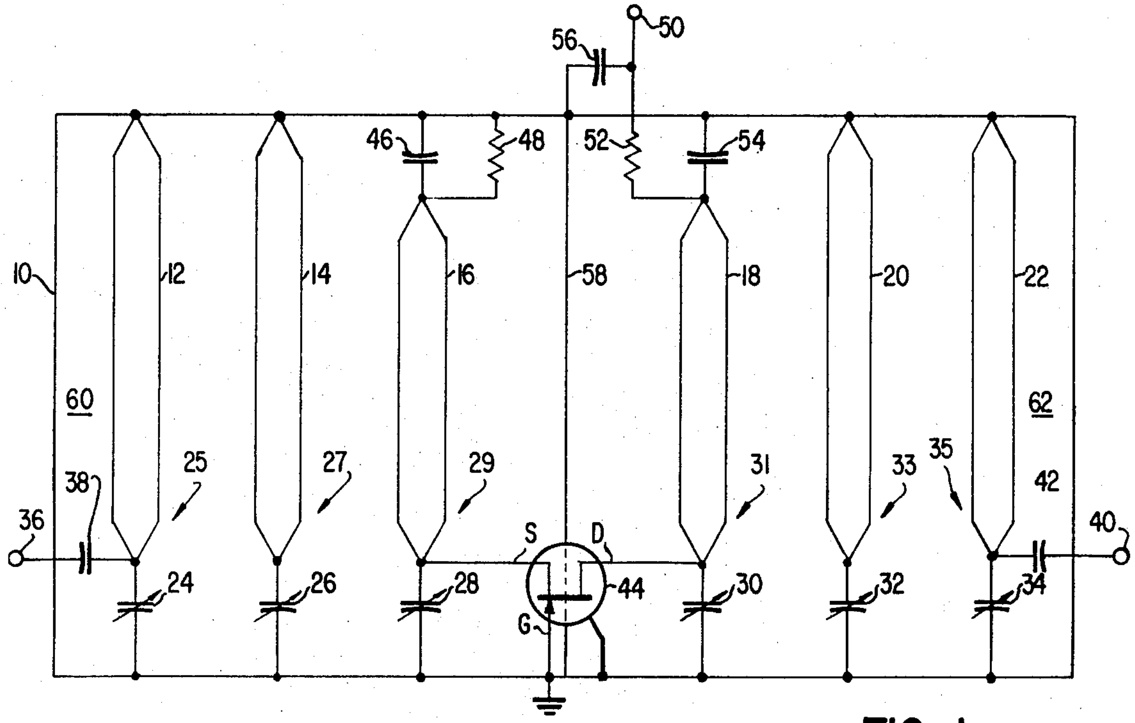
FIG. 1 is a schematic diagram representing the circuit of the preferred embodiment of the invention.

Referring now to the drawings wherein like reference numerals designate identical or corresponding parts throughout the several views, and more particularly to FIG. 1 thereof wherein the instant invention is shown in schematic form as mounted within a grounded framework 10 of conductive material. The framework 10 may be, for example, a standard aluminum chassis box of convenient dimensions with removable top and bottom plates. A group of parallel strip line inductive elements 12, 14, 16, 18, 20 and 22 is mounted within the framework 10. When the chassis box is assembled and grounded, the top and bottom plates form upper and lower ground planes, respectively, with respect to the strip line inductive elements. The term "strip line" is meant to indicate a structural characteristic rather than a particular configuration of the inductor elements. For example, a strip line inductor element may take the form of a metal strip, a strip of double-sided printed circuit board, two strips of single-sided printed circuit board coupled together, a length of copper tubing, a brass rod, a section of etched printed circuit board with a conductive filament imprinted on it, or any number of equivalent structures. One of the important common characteristics of these various structures is that they lack many of the spurious effects, such as interwinding capacitances, commonly present in coil type inductors. In addition, they are relatively large in size, yet have small radio frequency inductances, a feature which simplifies the task of mass producing elements having precisely the amount of inductance desired. The use of printed circuit inductive elements is especially advantageous because large scale production costs are low, and because they may be readily reproduced once a master pattern is made. It will be understood that by "printed circuit inductive elements" is meant a conductive filament of linear or other configuration imprinted on an etched circuit board. This is to be distinguished from an inductive element composed of unetched strips of printed circuit board.

Perhaps more important is the fact that the efficiency of resonant circuits using strip line inductive elements is generally more strongly dependent on the radio of inductance to capacitance than in coil inductor circuits, thereby improving the tuning accuracy of the strip line circuits relative to circuits using coil inductors. In addition, the Q of strip line resonant circuits can be made to remain nearly constant over a much broader range of frequencies than that of conventional coil circuits.

It will be apparent to those skilled in the art, that inductive elements 12, 14, 16, 18,20 and 22 are quarter wave length devices. That is, disregarding spurious effects, each inductive element should have a conductive path with a physical length equivalent to approximately one-quarter of the wave at which the inductor circuit is to resonant. At longer wave lengths, however, the length of the inductive elements tends to become unwieldy, and it therefore becomes practical to capacitively load the inductive elements thereby increasing their effective lengths. The addition of adjustable capacitive loading is also important in that it permits tuning of the resonant frequency of the resulting circuit.

Thus, as shown in FIG. 1, capacitive elements 24, 26, 28, 30, 32, and 34 are coupled to inductor elements 12, 14, 16, 18, 20, and 22, respectively.

Each of capacitive elements 24, 26, 28, 30, 32, and 34 may be conventional, adjustable, air insulated capacitors. Fixed value ceramic capacitors may be shunted across the adjustable capacitors where necessary to increase the capacitance of the circuit and thereby permit lower resonant frequencies to be attained.

Each of capacitive elements 24, 26, 28, 30, 32, and 34 is also coupled to framework 10, and thereby to ground. Each of the inductive-capacitive element combinations just described forms a resonant circuit, or resonator, denoted by numerals 25, 27, 29, 31, 33, and 35.

An input terminal 36, to which a suitable source of radio frequency signals, such as an antenna or a preamplifier output may be connected, is coupled through a coupling capacitor 38 to the junction of inductive element 12 and capacitive element 24. Inductive element 12 is also coupled directly to framework 10 and thereby to ground. Similarly, inductive elements 14, 20, and 22 are coupled between framework 10 and capacitive elements 26, 32 and 34, respectively.

An output terminal 40 is coupled through a by-pass capacitor 42 to the junction of inductive element 22 and capacitive element 34.

A field effect transistor amplifier (FET) 44 is arranged in a common gate configuration and coupled at its source to the junction of inductive element 16 and capacitive element 28. The drain of FET 44 is coupled to the junction of inductive element 18 and capacitive element 30, and its gate and case is coupled to framework 10, thus being grounded.

By arranging the FET 44 in a common gate configuration, several significant advantages in the context of the instant invention are created. Among them, the neutralization requirement of common source circuits is eliminated. Without the need for neutralization, an amplifier circuit may be designed to have amplification and bandpass characteristics limited only by the characteristics of its input and output tuned circuits. Other advantages of the common gate configuration include low input impedance, reduced high frequency noise and distortion, and substantially greater resistance to overload and cross modulation at radio frequencies.

One example of an FET suitable for use in the circuit of FIG. 1 is the Siliconix 2N5397 J-FET, which has exceptionally good radio frequency performance characteristics.

The input circuitry of FET 44 includes the inductive element 16 which is isolated from framework 10 by means of a by-pass capacitor 46 and a biasing resistor 48 connected in parallel thereacross. Isolation of inductive element 16 is necessary to allow the DC bias current required for FET 44 to flow through it. The bias current is, of course, regulated by choosing a proper value for resistor 48.

Operating power is supplied to FET 44 through a terminal 50, which may be coupled to any suitable source of unidirectional potential. Terminal 50 is coupled through an isolating resistor 52 to inductive element 18, which in turn is connected to the drain of FET 44. A by-pass capacitor 54 is coupled between inductor element 18 and framework 10 so that the inductor element may be maintained at an appropriate DC bias level above ground.

An electromagnetic shield 58, which may be a sheet of double-sided copper clad printed circuit board, for example, is mounted within framework 10 to divide it into two sections, an input stage 60 and an output stage 62. By physically separating the input and output stages, shield 58 prevents any spurious electromagnetic coupling therebetween.

The radio frequency operation circuit is best understood once it is explained that input stage 60 and output stage 62 both constitute bandpass filters of the combline or interdigital variety. That is, the three resonators 25, 27 and 29 of input stage 60, linked together by electromagnetic fields, act as a bandpass filter for radio frequency signals. Likewise the three resonators 31, 33 and 35 of output stage 62 act together as a bandpass filter. Such filters are known in the art as combline or interdigital filters because their long resonator elements resemble comb's teeth or interlocked fingers.

While FIG. 1 illustrates the input and output stage filters 60, 62 as including three resonators each, a greater or lesser number of resonators may be used. In general, however, as more resonators are used, out-of-band rejection and bass band linearity increase.

It will be observed that resonators 29 and 31 serve a dual purpose in the circuit, since they act both as input and output tuned circuits, respectively, for FET 44, as well as resonator elements within filter stages 60 and 62.

Although each of filter stages 60 and 62 acts as a relatively narrow bandpass filter in itself, the intercoupling of two such filter stages causes the bandwidth of the overall circuit to be reduced to approximately one half that of a single filter stage, a very significant improvement in the context of the instant invention. The amplification stage provides gain in the pass band to further enhance the interference resisting characteristics of the combined filter and amplifier circuitry.

Additional amplification as well as improved rejection of out-of-band interference and narrower bandwidths may be attained by cascading two or more interdigital preamplifiers as the desire for better band isolation arises.

It has been discovered that although the circuit illustrated schematically in FIG. 1 may be constructed in a variety of equivalent ways, certain configurations of strip line inductive elements greatly enhance its performance. More particularly, it has been found that the performance of each filter stage depends upon the ratio of inductance to capacitance, the coupling between resonators, and the degree of impedance matching between the amplifier input and output tuned circuits and the amplifier (FET) itself.

In the preferred embodiment of the instant invention, the ratio of inductance to capacitance is adjustable, since each capacitive element 24, 26, 28, 30, 32 and 34 may be tuned. Thus the ratio may be set to any convenient value within the range of adjustment provided. Coupling between resonators, in contrast, is primarily a function of the configuration of the strip line inductive elements. In addition, the impedance of the inductive elements also depends upon their configuration, meaning that both coupling and impedance matching functions must be considered in selecting optimum configurations for the strip line inductive elements.

Figure 2:
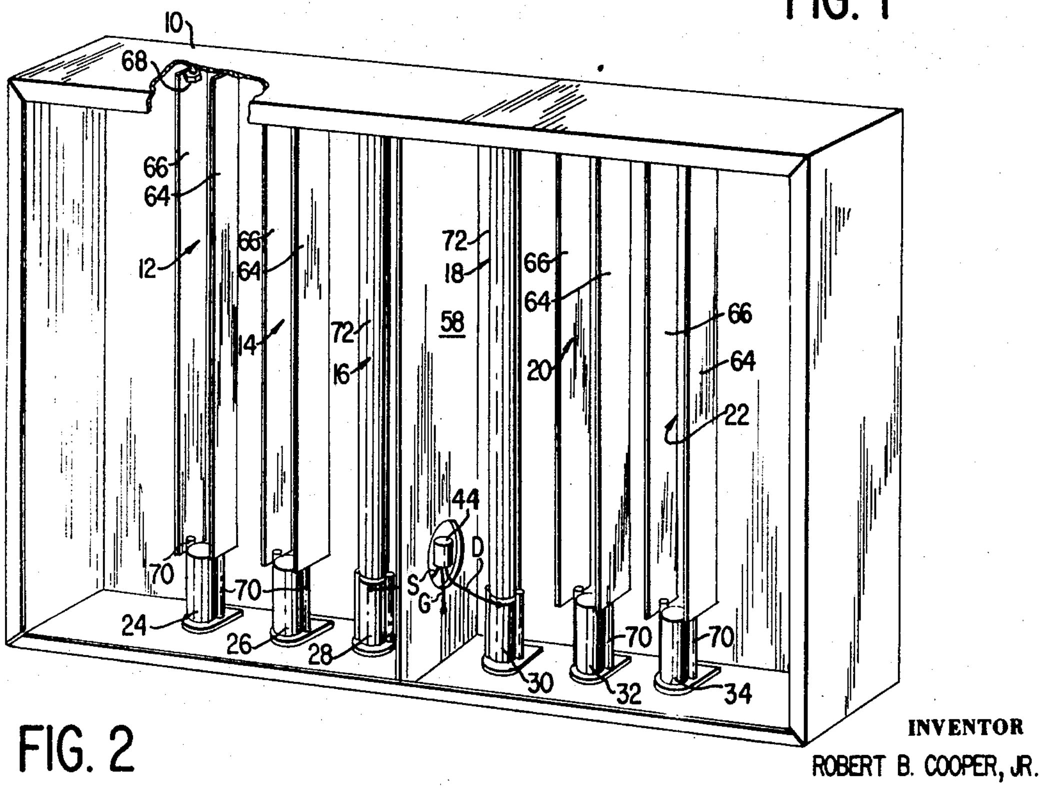
FIG. 2 is an illustration of the strip line inductive element structure used in the preferred embodiment of the invention.

A strip line configuration that has been found effective in the interdigital preamplifier of the present invention is illustrated in FIG. 2 (the inputs and outputs to the interdigital preamplifier are not shown). As shown, inductive elements 12, 14, 20 and 22 are identical in structure, and inductive elements 16 and 18 are also identical to one another, although different from elements 12, 14, 20 and 22.

Inductive elements 12, 14, 20 and 22 each consist of two metallized strips 64 and 66, which may be strips of printed circuit board, for example, each strip being metallized on one side only. The strips are arranged parallel to one another such that the two metallized surfaces face outwardly and the two unmetallized surfaces face one another. In this configuration, one metallized surface of inductive element 12 is facing and parallel to, one metallized surface of inductive element 14, allowing good electromagnetic coupling between the two elements. The strips 64 and 66 are mounted to framework 10 and electrically coupled to one another by means of a suitable mounting member 68 of conductive material. A similar mounting member 70, also of conductive material, secures strips 64 and 66 to capacitive elements 24, 26, 32 and 34. The structure and mounting of inductive elements 14, 20 and 22 are precisely the same as that of element 12, including strips 64 and 66 and coupling member 68 and 70, as shown in FIG. 2.

Inductive elements 16 and 18 are of different structure, however. Each consists of a length of tubing 72, which may be copper tubing, for example. Tubing is used for inductive elements 16 and 18 because it has been found to provide a better impedance match to FET 44. It will be understood, of course, that the circuit may be constructed using other amplifiers than the particular FET amplifier illustrated in FIG. 1. Since different amplifiers may have different impedance characteristics, different structural configurations for inductive elements 16 and 18 may be found to provide better results. However, it may still be advantageous to use two different structural configurations of inductor elements in each filter to maximize coupling among resonators, yet provide accurate impedance matching for the amplifier stage. It will be understood, of course, that strip line inductive elements suitable for use in the circuit of the instant invention may be constructed in any of the forms and of any of the materials hereinbefore enumerated as appropriate for strip line inductive elements.

Obviously, numerous additional modifications and variations of the present invention are possible in light of the above teachings. It is therefore to be understood that within the scope of the appended claims the invention may be practiced otherwise than as specifically described herein.

What is claimed as new and desired to be secured by Letters Patent is:

1. An interdigital preamplifier comprising:

radio frequency amplifying means;

first filter circuit means coupled to said amplifying means for applying a bandpass input signal thereto, said first circuit means including at least one resonant circuit, said resonant circuit being comprised of a strip line inductive element having a capacitive element coupled thereto;

second filter circuit means coupled to said amplifying means for receiving a bandpass output signal therefrom, said second filter circuit means including at least one resonant circuit, said resonant circuit comprised of a strip line inductive element having a capacitive element coupled thereto; and, housing means including top and bottom portions, said strip line inductive elements coupled at both ends thereof to said housing means and arranged in parallel configuration, said top and bottom portions of said housing means forming upper and lower ground planes with respect to said strip line inductive elements.

2. An interdigital preamplifier as in claim 1, wherein:

said first and second filter circuit means each include a plurality of said resonant circuits.

3. An interdigital preamplifier as in claim 2, wherein:

said capacitive elements included in said plurality of resonant circuits are adjustable, whereby said first and second filter circuit means are tunable to a selected frequency pass band.

4. An interdigital preamplifier as in claim 2, wherein:

said first and second filter circuit means each include at least one resonant circuit having a strip line inductive element of a first structural configuration, and at least one resonant circuit having a strip line inductive element of a second structural configuration.

5. An interdigital preamplifier as in claim 2, wherein:

said first and second filter circuit means each include at least one resonant circuit having a strip line inductive element of tubular configuration, and at least one resonant circuit having a strip line inductive element comprised of a pair of metalized strips.

6. An interdigital preamplifier as in claim 1, wherein:

said strip line inductive elements are imprinted on etched printed circuit boards.

7. An interdigital preamplifier as in claim 2, wherein:

said radio frequency amplifying means includes a field effect transistor.

8. An interdigital preamplifier as in claim 7, wherein: said field effect transistor is arranged in common gate configuration.

* * * * *